United States Patent [19]

Carnes

[11] Patent Number: 4,872,424
[45] Date of Patent: Oct. 10, 1989

[54] INTAKE MANIFOLD WITH REMOVABLE BAFFLES

[76] Inventor: Larry N. Carnes, 1228 Wynkoop, Colorado Springs, Colo. 80909

[21] Appl. No.: 180,903

[22] Filed: Apr. 13, 1988

[51] Int. Cl.[4] .................. F02B 17/18; F02M 35/10
[52] U.S. Cl. .......................... 123/52 MV; 123/52 MC
[58] Field of Search ......... 123/52 M, 52 MC, 52 MV

[56] References Cited

U.S. PATENT DOCUMENTS

| | | |
|---|---|---|
| 3,467,072 | 9/1969 | Toesca . |
| 3,831,566 | 8/1974 | Thomas .............................. 123/52 M |
| 4,109,619 | 8/1978 | Morris ................................ 123/52 R |
| 4,210,107 | 7/1980 | Shaffer ............................ 123/52 MB |
| 4,274,368 | 6/1981 | Shaffer ............................ 123/52 MB |
| 4,279,224 | 7/1981 | Szabo et al. ........................ 123/52 M |
| 4,492,212 | 1/1985 | Dooley ................................. 123/590 |

FOREIGN PATENT DOCUMENTS 0005933 12/1979 European Pat. Off. ......... 123/52 M

Primary Examiner—David A. Okonsky
Attorney, Agent, or Firm—Timothy J. Martin; J. Preston Oxenham

[57] ABSTRACT

An intake manifold apparatus for use with a combustion engine has a lower manifold unit with lower runner portions and a lower plenum portion and an upper manifold unit with an intake manifold opening surrounded by a carburetor mounting flange, upper runner portions and an upper plenum. When the upper and lower manifold units are assembled the upper and lower plenum portions form a plenum chamber in fluid communication with the intake opening and the upper and lower runner portions form a plurality of intake runners between the plenum chamber and the respective cylinders each of which has an outlet port and a surrounding passageway side wall. The unit is constructed so that each outlet port is aligned in fluid communication with a respective cylinder intake port. Baffle means are removably mounted as part of the assembled unit for directing flow of the fuel mixture and form a relatively uninterrupted extension of each of the respective flow passageways.

31 Claims, 5 Drawing Sheets

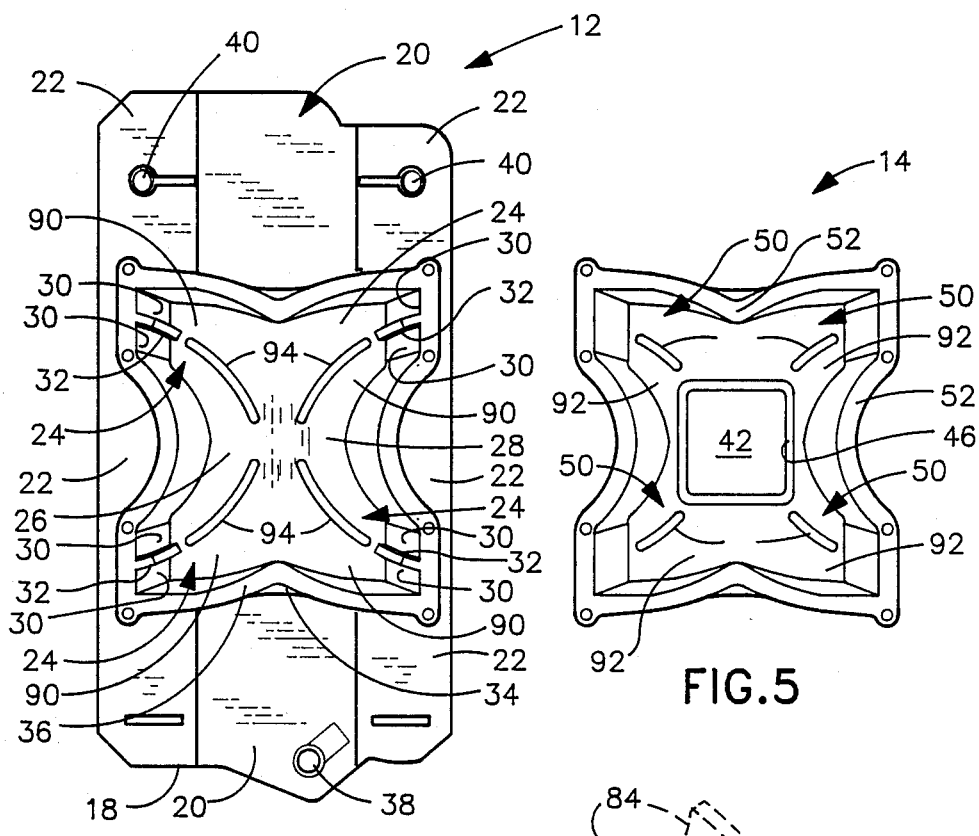
FIG.4
FIG.5
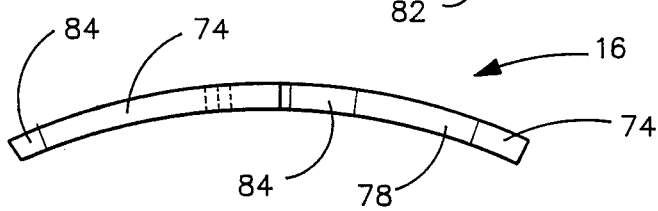
FIG.7
FIG.8

INTAKE MANIFOLD WITH REMOVABLE BAFFLES

FIELD OF THE INVENTION

The present invention is directed to intake manifold technology as applied to internal combustion engines wherein the intake manifold is constructed as a fluid flow structure receiving a combustive fuel mixture from a carbureting device and which distributes the combustive fuel mixture to the cylinder intake ports of the engine's combustion cylinders. More specifically, the present invention relates to a manifold apparatus with adjustable structure operative to alter the flow characteristics of a combustive fuel mixture so as to enhance the performance of the internal combustion engine. The invention is particularly concerned with adjusting the peak power and the power range of the engine in racing applications.

BACKGROUND OF THE INVENTION

It has long been known that the fluid flow characteristics of an intake manifold can dramatically impact the operational performance of an internal combustion engine thus affecting the response of such engine to different driving conditions. For a given combustive fuel mixture, such as a mixture of gasoline or alcohol with air or nitrous oxide, it is known that the horsepower output of an engine is in direct proportion to the volume of combustive fuel mixture delivered to the engine's cylinders during each power cycle thereof. While it is known, and in certain applications common, to super charge or turbo charge an engine to increase the quantity of fuel product in a cylinder fill during the power cycle, in normal applications, it is the flow dynamics of the carbureting and intake system that determine the efficiency of the delivery of the fuel product mass during the product cycle.

Some of the variables which affect the flow dynamics include the flow capacity of the carburetor, the size of the carburetor outlet, including any restrictions thereof, the size of the intake manifold, or injector or throttle body inlet opening, the volumetric size of the manifold plenum chamber, the cross sectional area of the intake runners and the size of the combustion cylinder inlet as defined by the smaller of the cylinder intake port and runner outlet opening. There are many interrelationships among these variables, and it is often necessary, for peak performance, that these variables be tuned as closely as possible to one another. In these applications, it is desirable to increase volumetric air flow while decreasing any backflow in the intake manifold caused either by turbulence, dead air spaces, or through reverse flow pulses caused by the exhaust stroke of the cylinder during that interval when both intake and exhaust valves are open. The proper timing of the fuel mixture flow can result in reducing turbulence through stable flow and can create inertial filling of the combustion cylinders to increase power.

It is further known that the performance demands on an engine may dictate the desirable flow characteristics of the intake manifold. For example, where maximum speed is sought for the vehicle powered by the engine, a narrow power band having a higher peak power but narrower operative range is desirable. This would be the case where a race car driver seeks to qualify for a race by posting the highest possible lap time. On the other hand, in an actual race numerous vehicles populate the track., different driving situations are encountered. Here, a wider power band is desired even though such wider power band sacrifices the peak power. Accordingly, many race mechanics find it necessary to have a plurality of different intake manifolds on hand for a given engine in order to obtain different results. This procedure is costly, cumbersome, and lacking in flexibility of adjustment.

The need for better intake manifolds useful in racing applications has been recognized in the past, and attempts have been made to improve the flow characteristics of intake manifolds. One such example is found in Morris U.S. Pat. No. 4,109,619 issued August 29, 1978. In this patent, an adapter plate mounts across the manifold inlet opening between the manifold and the outlet of the carbureting device, and a contour block insert is mounted to the adapter plate and downwardly depends into the interior of the plenum chamber. The adapter plate has a plurality of openings which correspond to the runners of the intake manifold, and the contour block attempts to provide contour surfaces to direct the flow of the fuel mixture toward the intake runners. Different contour block inserts may be employed with this adapter plate.

Another intake manifold apparatus is described in Shaffer U.S. Pat. No. 4,210,107 issued July 1, 1980. In the Shaffer patent, linear runners form passageways which convey the fuel mixture from the manifold plenum chamber to the intake ports of each combustion cylinder. Each such passageway has a false side wall formed by a movable panel which moves radially within the passageway so as to alter its effective cross section. This device attempts to match the amount of fuel mixture flow which the cylinder heads and the intake manifold will flow based upon the revolutions per minute and torque on the engine.

Another device constructed to permit modification of the intake manifold is described in Szabo, et al. U.S. Pat. No. 4,279,224 issued July 29, 1981. Here, the manifold apparatus is separated into a valley cover section and a plenum/intake runner section. The engine valley cover section is provided with an integral coolant crossover and distributor mountings so that it may be secured to the engine. The plenum/intake runner section may then be removably mounted to the engine valley section so that differently configured plenum chamber/intake runner sections may be used with a common engine valley section and that these may be interchanged without removing the entire intake manifold apparatus. While this device has advantage over changing the entire intake manifold, it nonetheless remains cumbersome and expensive since numerous/intake runner plenum chamber units must be maintained on hand to give any flexibility in varying of the flow dynamics for the engine.

Despite the advancements described in the above-referenced patents, there remains a need for an improved intake manifold apparatus that permits flexibility in adjustment of flow characteristics. There remains a further need for intake manifold apparatus which may be mounted on different engines of the same block size and which may be adjusted to provide different flow characteristics for such different engines. There is a further need for an adjustable manifold apparatus which can be used for racing applications and street driving and allows increased efficiency and power for an internal combustion engine.

SUMMARY OF THE INVENTION

It is an object of the present invention to provide a new and useful intake manifold apparatus which has adjustable fluid flow characteristics to increase the performance of an internal combustion engine associated therewith.

Another object of the present invention is to provide an intake manifold apparatus which is operative to distribute a fuel mixture from a carburetion device to the combustion cylinders of an engine while maximizing the laminar flow of the fuel mixture through the intake manifold apparatus.

A further object of the present invention is to provide an intake manifold apparatus having a multi-unit construction and which includes a plurality of removable baffle panels allowing both ease and flexibility of adjustment of flow characteristics of the manifold apparatus.

Yet another object of the present invention is to provide an intake manifold apparatus that is tunable to an engine to reduce both turbulence and dead air spaces while also reducing the backflow of exhaust gases.

A still further object of the present invention is to provide an intake manifold apparatus that increasing the amount of inertial filling of the combustion cylinders so as to increase an engine's performance and power.

The present invention accomplishes these objects by providing a multi-section intake manifold apparatus which receives removable baffle panels so that different selected baffle panel sets may be employed to change the operative characteristics of the engine. In the preferred embodiment, the manifold apparatus is formed as a lower manifold unit and an upper manifold unit. The lower manifold unit is formed to have lower runner portions and a lower plenum portion. The upper manifold unit has upper runner portions and an upper plenum portion and forms an intake manifold opening surrounded by a carburetor-mounting flange to mount a desired carburetion device. The upper and lower manifold units are mountable together as an assembled unit whereby the upper and lower plenum portions form a plenum chamber which is in fluid communication with the intake opening and whereby the upper and lower runner portions form a plurality of intake runners defining fluid flow passageways between the plenum chamber and respective ones of the combustion cylinders. The assembled unit thus distributes the combustive fuel mixture to a plurality of combustion cylinders of an engine. Each of these flow passageways has an outlet port, and the upper and lower manifold units are constructed so that the assembled unit has an outlet port aligned in fluid communication with respective cylinder intake port so that a fuel mixture may be provided to each combustion cylinder. Baffle means, preferably in the form of a set of baffle panels, are removably mountable as part of the assembled unit for directing the flow of the fuel mixture, with the baffle means forming an extension of each respective flow passageway. Preferably, the baffle panels are operative to extend the effective longitudinal length of each flow passageway and are configured to increase the laminar flow of the fuel mixture through the intake manifold apparatus.

In the preferred embodiment, the intake runners formed by the upper and lower runner portions have opposed interior side walls such that intake runner has an upstream entryway communicating with the plenum chamber and web, preferably formed entirely in the lower manifold unit, separates a downstream portion into a pair of flow passageways each communicating with a respective cylinder intake port. The baffle panels are removably mounted across each intake runner between the imposed runner interior side walls with each baffle panel having a downstream panel edge abutting an upstream edge of an associated web. The downstream edge of the baffle panel may include a pair of wings formed integrally therewith to define a slot operative to receive the upstream edge of the respective web. The upstream panel edge of each baffle panel is preferably arcuate in shape and extends into the plenum chamber. The baffle panels are preferably mounted in facing grooves formed between the opposed runner interior side walls and, to this end, each baffle panel has a central portion from which oppositely project upper and lower tongues shaped to engage a pair of matched grooves. These tongues are formed to completely fill a respective groove so that the lower flow surface of the assembled unit is relatively smooth and uninterrupted.

The baffle panels, in turn, may either have a common thickness as the tongues so that they are plate-like members, but the baffle panels may also be shaped to provide contour surfaces and thus have various dimensions. This could include providing central portions that are thicker than their respective tongues with the thickened central portions operative to reduce the flow cross section of each flow passageway. A standard baffle panel may be provided so that the ultimate user of this intake manifold apparatus with adjustable baffles may custom configure different sets of baffle panels for a desired intake manifold apparatus.

The preferred intake manifold apparatus is constructed for a V-type engine block, and, if desired, the lower manifold unit may, itself, be formed by two sections mountable together. Here, a base engine cover section and a separate lower runner section are provided such that the base engine cover section may be independently mounted on the cylinder block. The base engine cover section has openings oriented and configured to match each cylinder intake port, and the lower runner section is then removably mounted to the base cover section so that the runner outlets of the assembled unit still communicate with the respective opening in the base engine cover section. If desired, a contour plate may also be mounted to the bottom interior wall of the plenum chamber to form an adjustable contour surface therefor.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 4 is a top plan view of the lower manifold unit used to construct the intake manifold apparatus of FIG. 1;

FIG. 5 is a bottom plan view of the upper manifold unit mountable on the lower manifold unit of FIG. 4 in order to construct the assembled unit for the intake manifold apparatus;

FIG. 7 is a side view in elevation of a removable baffle panel for use in the present invention;

FIG. 8 is a top plan view of the baffle panel shown in FIG. 7;

DETAILED DESCRIPTION OF THE PREFERRED EMBODIMENT

The present invention is directed to a manifold apparatus that is adapted for use with a combustion engine in order to distribute a combustive fuel mixture to a plurality of combustion cylinders. Thus, the present invention provides a new and useful intake manifold that allows a user to adjust the fluid flow dynamics of the intake manifold in order to enhance the performance of the engine; this is accomplished by removable sets of baffle panels which configure the flow geometry of the flow mixture as it passes from the carbureting device, through the intake manifold into the engine. In operation, the present manifold apparatus is specifically adapted for use with a V-shaped cylinder block engine and has particular usefulness in racing applications.

Figure 1:
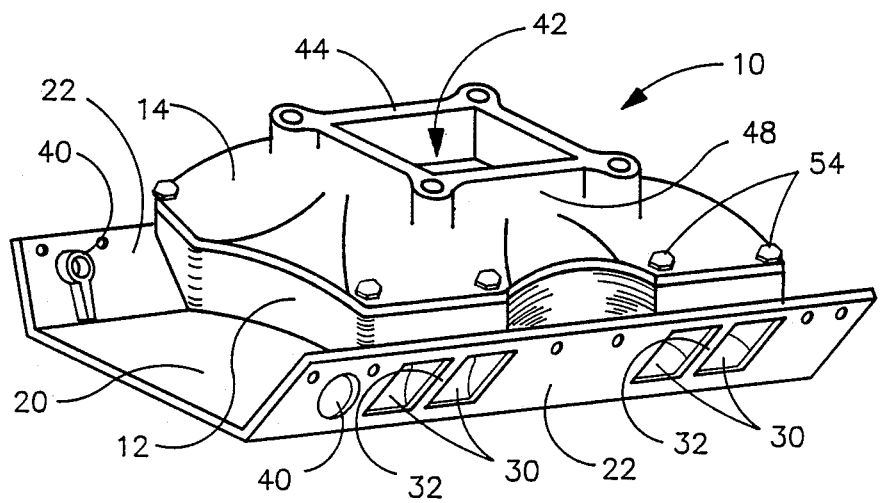
FIG. 1 is a perspective view of the intake manifold apparatus with removable baffles according to the preferred embodiment of the present invention.
Figure 2:
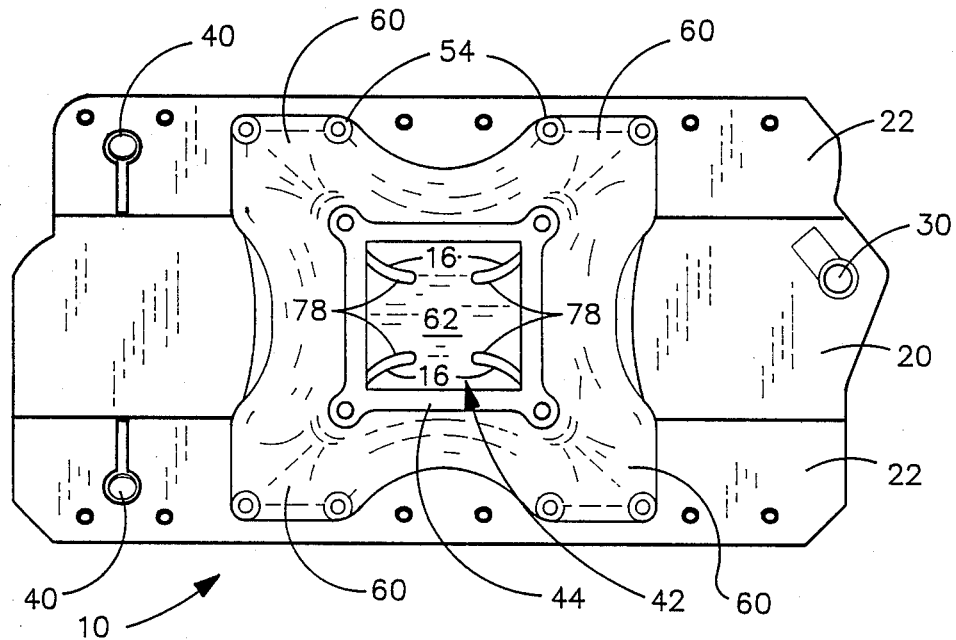
FIG. 2 is a top plan view of the intake manifold apparatus shown in FIG. 1.
Figure 3:
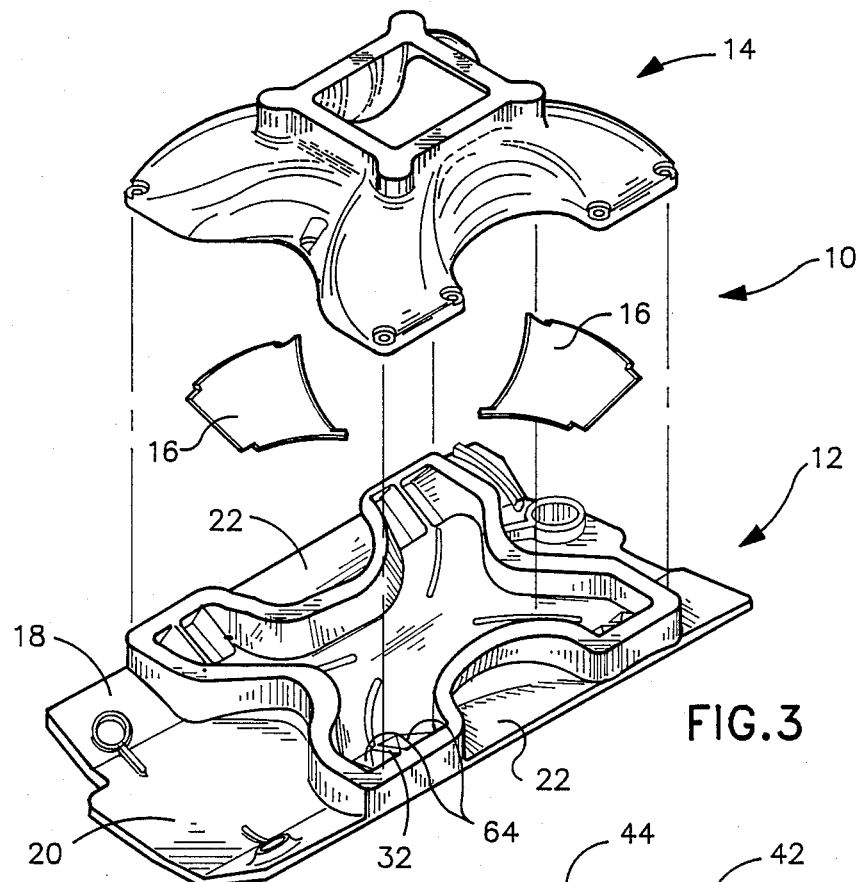
FIG. 3 is an exploded perspective view of the intake manifold apparatus shown in FIG. 1 and showing two removable baffle panels.

As is best shown in FIGS. 1–3, intake manifold apparatus 10 includes a lower manifold unit 12, an upper manifold unit 14 and a plurality of baffle panels 16 forming a set of removable fluid flow control structures. Upper manifold unit 14 is removably mountable to lower manifold unit 12, and lower manifold unit 12 includes an engine valley cover section 18 which mounts onto a V-shaped internal combustion engine by bolts as is known in the art. Engine valley cover section 18 includes a central portion 20 and a pair of laterally projecting flange portions 22 so that engine valley cover section 18 may extend across and cover the engine valley of a V-shaped internal combustion engine. However, even though the present invention is described with respect to a V-shaped engine, it should be fully appreciated that the present apparatus may be used with engines having other cylinder configurations.

Lower manifold unit 12 is best shown in FIGS. 3 and 4 where it can be seen that lower manifold unit 12 has lower runner portions 24 and a lower plenum portion 26 which have contoured bottom walls 90 and 28, respectively which define a continuous contour surface. Each of lower runner portions 24 have outlet openings 30 formed as pairs of openings separated from one another by a respective web 32, preferably formed entirely within each lower runner portion 24 of lower manifold unit 12. Peripheral wall 34 extends around lower runner portions 24 and lower plenum portion 26 and has an upper rim or flange 36 adapted to mate with upper manifold unit 14, as described below. Central portion 20 of engine valley cover section 18 includes a distributor mount 38 and a pair of coolant crossover ports 40 respectfully permitting attachment of a distributor and coolant crossover conduit as is known in the art. Coolant crossover ports 40 are formed on respective flange 22 on either side of central portion 20.

Upper manifold unit 14 is best shown in FIGS. 1, 2 and 5. In these figures, it may be seen that upper manifold unit 14 has an intake manifold opening 42 which is surrounded by a carburetor mounting flange 44. Side wall 46 forms an upper plenum portion 48, and upper manifold unit 14 includes a plurality of upper runner portions 50, and rim or flange 52 extends around the perimeter of upper manifold unit 14 and is configured to correspond to the shape of flange 36 of lower manifold unit 12, as is shown in FIG. 4.

Figure 6:
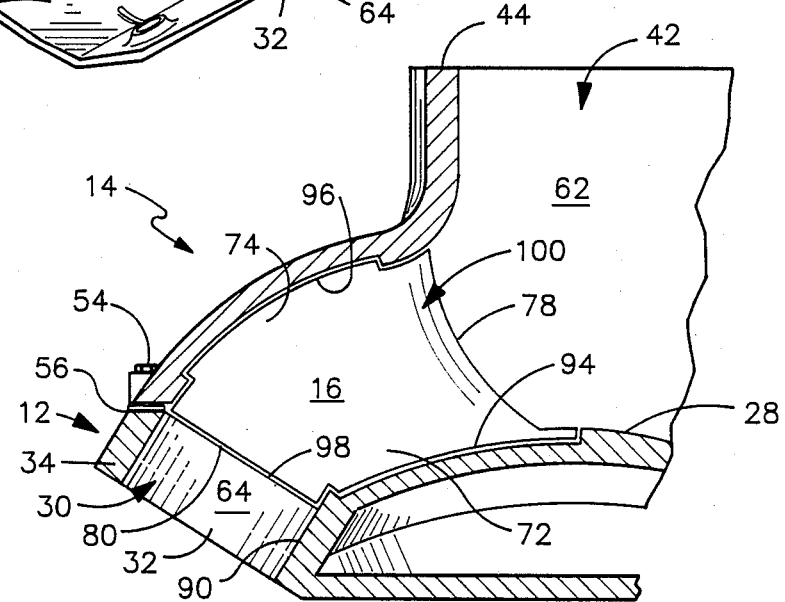
FIG. 6 is a cross sectional view showing a portion of the assembled intake manifold apparatus with removable baffle plate.

As is shown in FIGS. 1, 2 and 6, upper manifold unit 14 is removably mountable to lower manifold unit 12 by means of a plurality of bolts 54 and gasket 56 may be positioned therebetween in order to seal manifold units 12 and 14 together as an assembled unit. When assembled, lower runner portions 24 and upper runner portions 50 form runners 60, and lower plenum portion 26 and upper plenum portion 28 form a plenum chamber 62, all as best shown in FIG. 2. In FIG. 2, there are four such runners 60, each communicating with a pair of runner outlet openings 30 (shown in FIG. 1) with the intake manifold apparatus 10 shown in these figures being adapted for use with a V-8 engine having eight combustion cylinders each having a cylinder intake port located on an intake face of the cylinder block. Each of runners 60 is thus separated into a pair of flow passageways 64 by each respective web 32 as is shown in FIGS. 3 and 6. When mounted on a combustion engine, outlet ports 30 align in fluid communication with a respective cylinder intake port so as to establish a fuel mixture flow path from intake manifold inlet or opening 42 to each respective combustion cylinder.

As discussed in the Background of the Present Invention, above, it is highly desirable to increase the efficiency of flow of the fuel mixture by eliminating dead air spaces, turbulence, back pressure, pulsations and the like. For increased power of the engine, it is desirable that the fuel mixture undergo laminar flow through intake manifold apparatus 10. In the preferred embodiment of the present invention, enhanced laminar flow is accomplished by the addition of removable baffle means in the form of a plurality of baffle panels 16. In the embodiment shown in FIGS. 1–6, a set of four such baffle panels 16 are employed (FIG. 2) although, for the sake of clarity, only two such baffle panels are illustrated in FIG. 3. It is contemplated by the present invention that sets of various differently shaped panels 16 be used so that an engine operator may use different sets of baffle panels 16 to accomplish a desired performance result for the engine.

FIG. 7 illustrates an example of a baffle panel 16 which has a central portion 70 from which project opposite tongues, namely lower tongue 72 and upper tongue 74. As is shown in FIG. 7, baffle panel 16 may be configured to have a specific size including the portion shown at 76 in phantom, with the portion shown in phantom being removed by a mechanic so that baffle panel 16 has the shape shown in FIG. 7. By providing an enlarged baffle panel, the mechanic can custom configure a desired baffle panel for use with intake manifold apparatus 10. Thus, the baffle panel 16 illustrated in FIG. 7 includes a first edge 78 and an opposite edge 80 which respectively form upstream and downstream edges for baffle panel 16. Further, it may be seen that lower tongue 72 is mounted on lower edge 82 while upper tongue 74 is mounted on upper edge 84 of central portion 70. Baffle panel 16 has the same thickness as tongues 72 and 74.

Turning again to FIGS. 1-6, it may be seen that runners 60 have surrounding interior side walls and include, for example, opposed runner interior walls 90 and 92. As noted above, interior runner bottom wall 90 is formed as a continuation of bottom wall 28 of plenum chamber 62, as is shown in FIG. 6. Likewise, wall 92 is formed as a continuation of side wall 46 so that they define a continuous contour surface. Each baffle panel 16 is mounted in a respective runner 60 by means of a pair of opposed grooves such as a lower groove 94 formed in bottom wall 90 and upper groove 96 formed in interior runner wall 92. Walls 90 and 92 define a portion of a surrounding side wall for runner 60.

As is shown in FIG. 6, tongue 72 is sized to completely fill lower groove 94 and upper tongue 74 is sized to completely fill upper groove 96. Edge 82 is contiguous with the continuous contour surface formed by walls 28 and 90, and edge 84 is contiguous with the continuous surface formed by walls 46 and 92. Grooves 94 and 96 are formed, and baffle panel 16 is configured so that downstream edge 80 of baffle panel 16 abuts an upstream edge 98 of web 32, again as is shown in FIG. 6. Thus, each baffle panel 16 forms an extension of web 32 so as to increase the effective longitudinal dimension of each flow passageway 64. As is shown in FIG. 2, upstream edges 78 of each baffle panel 16 projects into plenum chamber 62 so that each flow passageway 64 has an entryway at plenum chamber 62, for example, as represented by entryway 100 in FIG. 6. As is also shown in that figure, upstream edge 78 of panel 16 may conveniently have an arcuate shape.

In use, intake manifold apparatus 10 is mounted on the engine block of an internal combustion engine. Manifold apparatus 10 may be so mounted as an assembled unit, or, alternately, lower manifold unit 12 can be first mounted to the engine. Any suitable distributor device and coolant crossover may then be secured respectively at distributor mount 38 and crossover ports 40. Manifold apparatus 10 is opened by removing upper manifold unit 14 from lower manifold unit 12 so that the interior of plenum chamber 62 and runners 60 are exposed. A selected set of baffle panels 16 may then be mounted by placing their lower tongues 72 in grooves 94 after which upper manifold unit 14 is secured to lower manifold unit 12. Simultaneously with the securing of upper manifold 14 to lower manifold unit 12, upper tongues 74 of baffle panels 16 are inserted into upper grooves 96 formed in upper manifold unit 14. When the assembled unit is secured together by bolts 54, a suitable carburetion device may be attached to carburetor mounting flange 44 so that the outlet of the carburetion device communicates with intake manifold opening 42. Should the user desire to change the set of baffle panels 16, upper manifold unit 14 may simply be removed from lower manifold unit 12 and the panels replaced, without removing the entire intake manifold apparatus from the engine.

Figure 9:
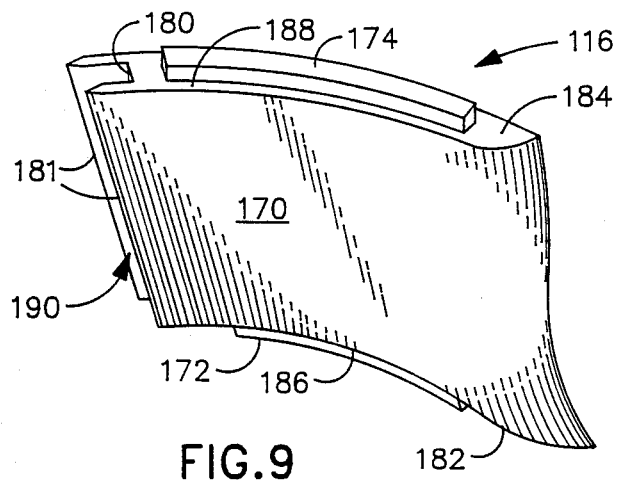
FIG. 9 is a perspective view of an alternate embodiment of a removable baffle panel.

While one set of baffle panel 16 has been described above, it is within the scope of the present invention to provide any of a variety of manifold baffle panels which are removable from the intake manifold in the manner described above. The species of baffle panels can be varied within the scope of skill of the mechanic, but one such alternate embodiment of a baffle panel is shown in FIG. 9 as baffle panel 116. Here, baffle panel 116 is substantially thicker than baffle panels 16, described above. In baffle panel 16, as is shown in FIG. 8, has a thickness the same as tongues 72 and 74. In the embodiment shown in FIG. 9, however, baffle panel 116 has a substantially greater thickness than its respective tongues 172 and 174 so that edges 182 and 184 respectively form shoulder portions 186 and 188 which will overlap their respective runner side wall so as to include a shoulder portion that is positioned along the opposed side walls. Furthermore, downstream edge 180 is flanked by a pair of rings 181 formed integrally with central portion 170 of baffle panel 116 to define a slot 190 that is adapted to receive an upstream edge portion of web 32 adjacent upstream edge 98 thereof. Use of baffle panel 116 not only extends the effective longitudinal dimension of a respective pair of flow passageway 64 but also reduces the cross section thereof.

Figure 12:
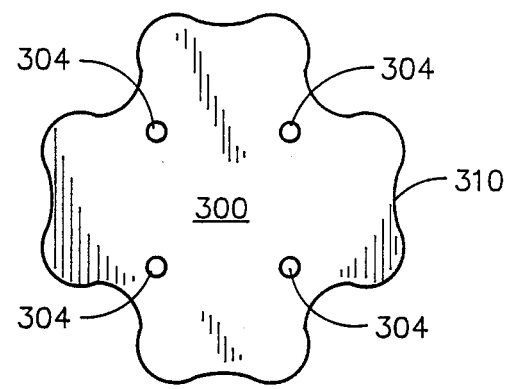
FIG. 12 is a top plan view of the contour plate used in the apparatus shown in FIG. 10.
Figure 11:
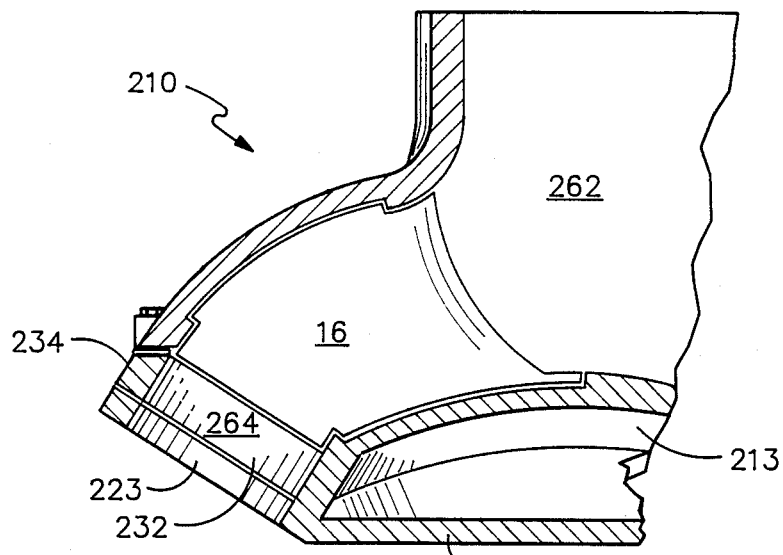
FIG. 11 is a cross sectional view, similar to FIG. 6, showing the assembled intake manifold structure with removable baffle panel for the embodiment shown in FIG. 10.
Figure 10:
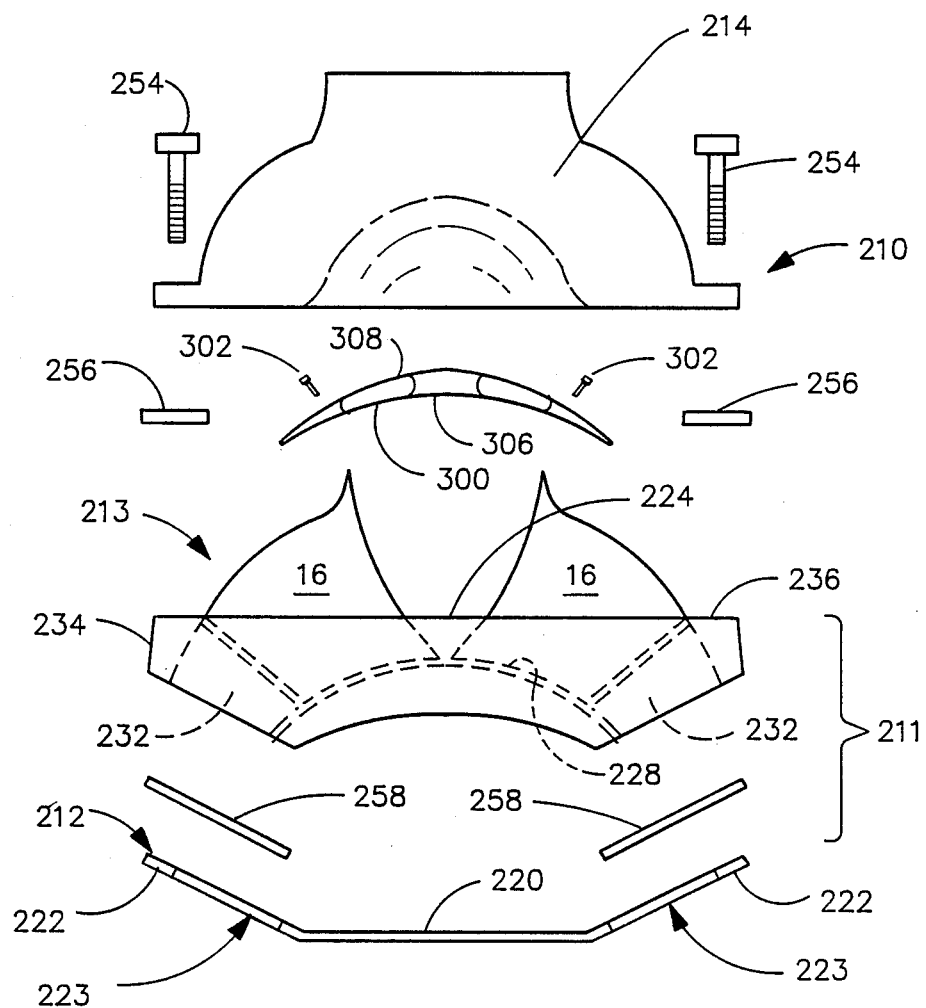
FIG. 10 is an exploded end view of an alternate embodiment of the present invention showing a three piece construction thereof along with an auxiliary bottom contour plate.

Further modification of the basic structure of manifold apparatus 10 is shown in the embodiment illustrated in FIGS. 10-12. Here, intake manifold apparatus 210 is formed by a lower manifold unit 211 is separated into two pieces, namely, a base engine cover section 212 and a lower runner section 213. As is best shown in FIG. 10, base engine cover section 212 is similar to engine valley cover section 18 described with respect to the preferred embodiment and includes a central portion 220 and a pair of flange portions 222 having openings 223. Base engine cover section 212 may be separately mounted on the cylinder block of the engine so that openings 223 align with and match each cylinder intake port. Lower runner section 213 then includes the remaining structure similar to lower manifold unit 12, namely, wall 234 forming flange 236, lower plenum portion 224 and lower runner portions 224 which are separated by webs 232 into flow passageways 264, as is shown in FIGS. 10 and 11. Upper manifold unit 214 mounts onto lower runner section 213 of lower manifold unit 211 in the manner identical to that described with respect to the preferred embodiment. To this end, bolts 254 and gasket 256 is provided. A second gasket 258 is provided to mount lower runner section 213 to engine cover section 212.

An additional modification is shown in FIG. 10, with this modification comprising a contour plate 300 which is adapted to be mounted by means of screws 302 to the bottom wall 228 of lower manifold unit 211, as is shown in phantom in FIG. 10. Contour plate 300 is best shown in FIG. 12 and includes a plurality of counter-sunk bores 304 to accommodate screws 302. Contour plate 300 has a bottom surface 306 and a top surface 308 which are convergent at perimeter 310 such that top surface 308 forms a flow contour for air moving through plenum chamber 262. Baffle panels 16 are again provided to extend to each passageway 264, as described with respect to the preferred embodiment.

It should be appreciated that contour plate 300 may be used in the embodiment shown in FIGS. 10-12, but also can be used in the embodiment described in FIGS. 1-6. In any event, it should be understood that bottom surface 306 is configured to be contiguous with the contour surface formed by the plenum chamber and runner bottom walls.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A manifold apparatus adapted for use with a combustion engine in order to distribute a combustive fuel mixture to a plurality of combustion cylinders in a cylinder block each cylinder having a cylinder intake port located on an intake face of said cylinder block, comprising:

a lower manifold unit mountable on said engine and having lower runner portions and a lower plenum portion;

an upper manifold unit having an intake manifold opening surrounded by a carburetor mounting flange, said upper manifold section having upper runner portions and an upper plenum portion;

said upper and lower manifold units mountable together in an assembled unit whereby said upper and lower plenum portions form a plenum chamber in fluid communication with said intake opening and whereby said upper and lower runner portions form a plurality of intake runners defining fluid flow passageways between said plenum chamber and respective ones of the combustion cylinders, each flow passageway having an outlet port and a surrounding passageway side wall, said assembled unit constructed so that each outlet port is aligned in fluid communication with a respective cylinder intake port; and baffle means removably mountable as part of the assembled unit for directing flow of the fuel mixture, said baffle means forming a relatively uninterrupted extension of each respective flow passageway.

2. A manifold apparatus according to claim 1 wherein said baffle means includes a plurality of removable baffle panels each operative to extend the effective longitudinal length of each flow passageway.

3. A manifold apparatus according to claim 2 wherein said baffle panels are configured to increase laminar flow of the fuel mixture through the intake manifold apparatus.

4. A manifold apparatus according to claim 1 wherein the intake runners formed by said upper and lower runner portions have opposed runner interior side walls, each said intake runner having an upstream entryway communicating with said plenum chamber and a downstream portion separated by a web into a pair of flow passageways each communicating with a respective cylinder intake port, said baffle means including a baffle panel removably mounted across each intake runner between the opposed runner interior side walls, each said baffle panel having an upstream panel edge and a downstream panel edge, each said downstream panel edge abutting an upstream edge of an associated said web and operative to extend the longitudinal dimension of the respective pair of flow passageways.

5. A manifold apparatus according to claim 4 wherein the downstream edge of each said baffle panel is flanked by a pair of wings formed integrally therewith to define a slot operative to receive the upstream edge of the respective said web.

6. A manifold apparatus according to claim 4 wherein each said upstream panel edge is arcuate in shape.

7. A manifold apparatus according to claim 4 wherein each said upstream panel edge extends into said plenum chamber.

8. A manifold apparatus according to claim 4 wherein each said web is formed in the lower manifold unit.

9. A manifold apparatus according to claim 4 wherein the opposed runner interior side walls of each intake runner have facing grooves formed therein to define a pair of matched grooves and wherein the baffle panel associated with each intake runner has a central panel portion and a pair of tongues projecting on opposite sides of said central panel portion, said tongues shaped to engage the pair of matched grooves of its respective intake runner to mount said baffle panel in the assembled unit.

10. A manifold apparatus according to claim 9 wherein one member of each said pair of matched grooves is formed as a lower groove along the lower runner portion of the lower manifold unit and the other member of each said pair of matched grooves is formed as an upper groove along the upper runner portion of the upper manifold unit.

11. A manifold apparatus according to claim 9 wherein the pair of tongues of each said panel completely fill its respective upper and lower grooves.

12. A manifold apparatus according to claim 9 wherein the central panel portion of each baffle panel has substantially the same thickness as its oppositely projecting tongues.

13. A manifold apparatus according to claim 9 wherein the central panel of each baffle panel is thicker than its oppositely projecting tongues to define a shoulder portion that is positioned along the opposed side walls.

14. A manifold apparatus according to claim 1 wherein said baffle means includes a contour plate mountable on a bottom interior wall of the assembled unit, said contour plate having a bottom surface conforming to the shape of said bottom interior wall and a top surface configured to define a flow contour, the top and bottom surfaces of said flow plate convergent at entryways for said flow passageways.

15. A manifold apparatus according to claim 1 wherein said lower manifold unit is formed by a base engine cover section and a separate lower runner section, said base engine cover section mountable on the cylinder block of said engine and having openings oriented and configured to match each cylinder intake port, said lower runner section removably mountable to said base engine cover section, said upper manifold unit and said lower runner section mountable together to form said intake runners each having a runner outlet, said intake runners configured whereby a respective said runner outlet communicates with a respective opening and cylinder intake port when said lower runner section is mounted to said base plate section.

16. In a manifold apparatus adapted for use with a combustion engine and a carburetor in order to distribute a combustive fuel mixture from said carburetor downstream to a plurality of combustion cylinders each having a cylinder intake port located on a cylinder block and wherein said manifold apparatus includes a plenum chamber receiving the combustive fuel mixture from the carburetor and at least one intake runner separated by a web into a pair of flow passageways in fluid communication with said plenum chamber and operative to distribute the combustive fuel mixture to the intake ports, the improvement comprising a removable baffle panel positioned across said intake runner as an extension of said web and operative to extend the longitudinal dimension of each of said flow passageways, said baffle panel having a downstream panel edge abutting an upstream web edge of said web.

17. The improvement according to claim 16 wherein said manifold apparatus includes a plurality of runners each having an interior top wall and an interior bottom wall, each said runner separated by a respective web into a pair of flow passageways in fluid communication with said plenum chamber, there being a removable baffle panel associated with each runner and positioned thereacross as an extension of a respective web and operative to extend the longitudinal dimension of the associated flow passageways, each baffle panel having a downstream panel edge abutting an upstream web edge of its associated web.

18. The improvement according to claim 17 wherein each of said baffle panels has an upstream panel edge extending into said plenum chamber whereby each of said passageways has a separate entryway at said plenum chamber.

19. The improvement according to claim 18 wherein said upstream panel edges is arcuate in shape.

20. The improvement according to claim 17 wherein the downstream panel edge of each baffle panel is flanked by a pair of wings formed integrally therewith to define a slot operative to receive an upstream portion of a respective web adjacent the upstream web edge of the respective web.

21. The improvement according to claim 17 wherein an upper groove is formed in each said interior top wall and a lower groove is formed in each interior bottom wall, each said runner including an upper tongue sized to engage a respective upper groove and a lower tongue sized to engage a respective lower groove to mount and position each said baffle panel.

22. The improvement according to claim 21 wherein said manifold apparatus is separated into an upper manifold unit forming upper portions of said runners and a lower manifold unit forming lower portions of said runners, said upper manifold unit being removably mounted on said lower manifold unit to retain said baffle panels in a mounted position.

23. The improvement according to claim 17 wherein said plenum chamber has a bottom interior wall formed contiguously with the interior bottom walls of the runners, and including a contour plate removably mounted on the bottom interior wall of the plenum chamber.

24. A manifold apparatus adapted for use with a V-type internal combustion engine in order to distribute a combustive fuel mixture from the outlet of a carburetion device to the cylinder intake ports of the combustion cylinders of said engine wherein the combustion cylinders are organized as first and second parallel banks each having an intake port face through which the cylinder intake ports of its respective combustion chambers open and which banks are separated from one another by an engine valley, comprising:
a lower manifold unit including an engine valley cover section having a central portion and first and second laterally projecting flange portions, said lower manifold unit mountable on said engine such that said engine valley cover section extends across and covers said engine valley with said first and second flange portions having first and second flange faces facing a respective intake port face, said lower manifold unit including a lower plenum chamber portion having a plenum bottom wall and including lower runner portions each having an interior runner bottom wall and terminating at a downstream end in manifold outlet ports formed in a respective one of the first and second flange portions, said manifold outlet ports each aligned with a respective cylinder intake port when the lower manifold unit is mounted on said engine;
an upper manifold unit mountable on said lower manifold unit and including an upper plenum portion having an intake manifold opening surrounded by a mounting flange for the carburetion device and including upper runner portions each having an interior runner top wall;
said upper and lower manifold units mountable together in an assembled unit whereby said upper and lower plenum portions form a plenum chamber in fluid communication with said intake manifold opening and whereby said upper and lower runner portions form a plurality of intake runners defining fluid flow passageways between said plenum chamber and respective ones of said manifold outlet ports; and
a removable baffle panel mounted in said assembled unit and operative to extend the longitudinal dimension of the respective fluid flow passageways thereof, said upper and lower manifold units engaging said baffle panel to secure and hold said baffle panel therebetween when assembled.

25. A manifold apparatus according to claim 24 wherein each said baffle panel is mounted between the runner top wall and the runner bottom wall of a respective runner.

26. A manifold apparatus according to claim 25 wherein each said baffle panel has an upstream edge projecting into said plenum chamber.

27. A manifold apparatus according to claim 26 wherein the plenum chamber has a plenum side wall, said plenum side wall and the runner top wall of each upper runner portion defining a continuous upper contour surface and the plenum bottom wall and the runner bottom wall of each lower runner portion defining a continuous lower contour surface, each said baffle panel having a top edge contiguous with said upper contour surface and a bottom edge contiguous with said lower contour surface.

28. A manifold apparatus according to claim 27 including a plurality of upper grooves formed in the upper contour surface and a plurality of lower grooves formed in the lower contour surface, said upper and lower grooves organized as groove pairs, there being an upper and a lower groove in each groove pair, each said baffle panel having a top tongue and a bottom tongue on a respective top and bottom edge, said top and bottom tongues engaging a respective upper and lower groove to mount the baffle panel.

29. A manifold apparatus according to claim 24 wherein each said runner is divided into a pair of said passageways by a web located at a downstream end of said runner, each said web having an upstream web edge located in its respective runner, said baffle panels each having a downstream panel edge abutting a said upstream web edge of a respective said web whereby said baffle panels further separate said runners into distinct passageways.

30. A manifold apparatus according to claim 24 wherein said lower manifold unit is formed as a separate engine valley cover section and a separate lower runner section having said lower runner portions, said engine valley cover section and said lower runner section mountable together to form said lower manifold unit.

31. A manifold apparatus according to claim 24 including a contour plate mountable on said plenum bottom wall to change the internal dimensions contour of said plenumn chamber.

* * * * *